Oct. 27, 1925.
C. O. MIKLE
1,558,994
AUTOMATIC DRIFTING VALVE SYSTEM
Filed Dec. 22, 1920     4 Sheets-Sheet 1
Fig. 1.
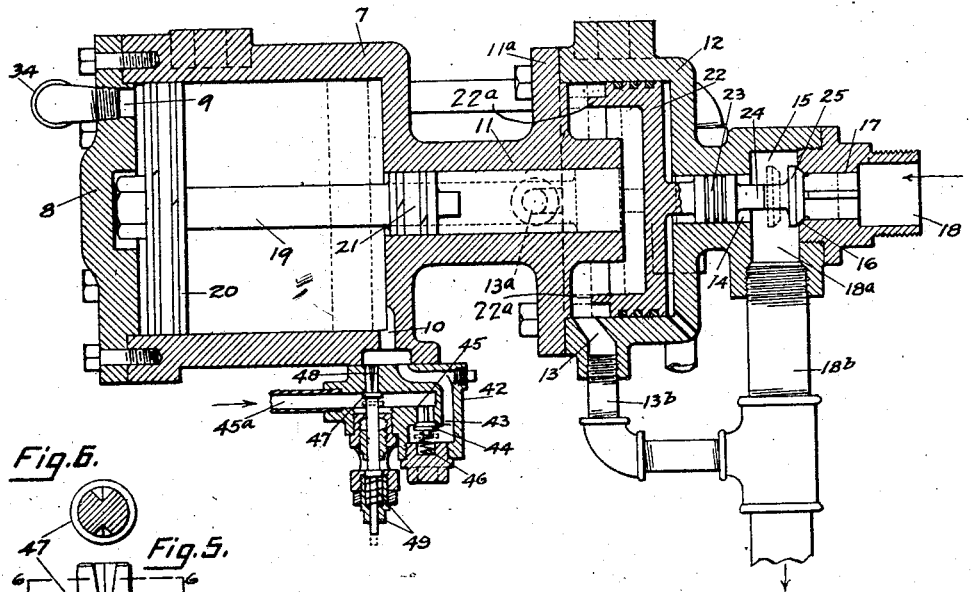
Fig. 6.
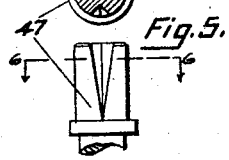
Fig. 5.
Fig. 2.
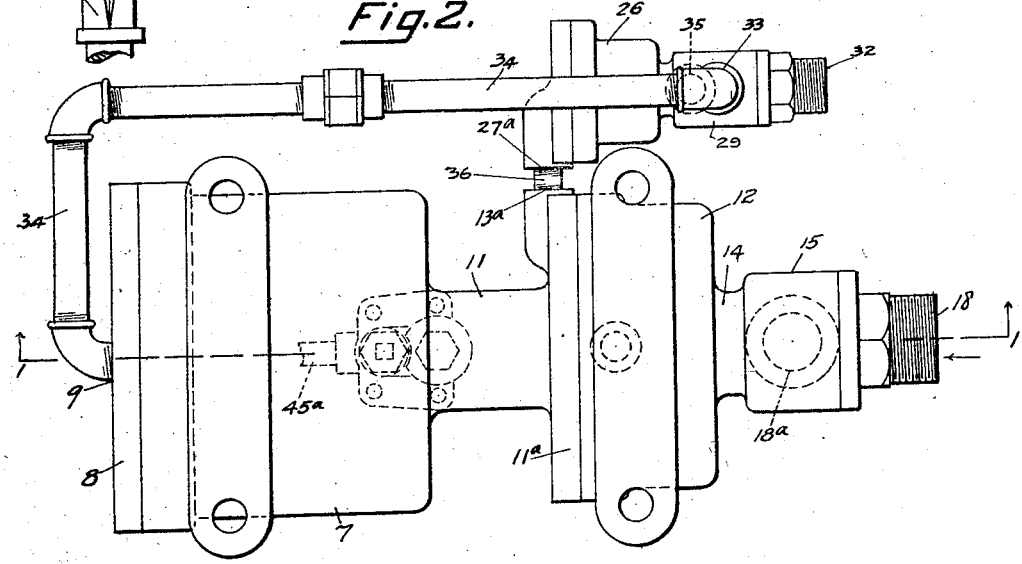
INVENTOR:
Clinton O. Mikle.
BY R C Wright
ATTY.

Oct. 27, 1925.

C. O. MIKLE 1,558,994

AUTOMATIC DRIFTING VALVE SYSTEM

Filed Dec. 22, 1920

INVENTOR:
Clinton O. Mikle
BY R. C. Wright
ATTY.

Oct. 27, 1925.

C. O. MIKLE 1,558,994

AUTOMATIC DRIFTING VALVE SYSTEM

Filed Dec. 22, 1920     4 Sheets-Sheet 3

INVENTOR:
CLINTON O. MIKLE

BY
R. C. Wright
ATT'Y

Oct. 27, 1925.

C. O. MIKLE 1,558,994

AUTOMATIC DRIFTING VALVE SYSTEM

Filed Dec. 22, 1920

INVENTOR:
CLINTON O. MIKLE.
BY R.C. Wright.
ATTY.

Patented Oct. 27, 1925.

1,558,994

UNITED STATES PATENT OFFICE.

CLINTON O. MIKLE, OF PORTLAND, OREGON.

AUTOMATIC DRIFTING-VALVE SYSTEM.

Application filed December 22, 1920. Serial No. 432,548.

*To all whom it may concern:*

Be it known that I, CLINTON O. MIKLE, a citizen of the United States, residing at Portland, in the county of Multnomah and State of Oregon, have invented a new and useful Improvement in Automatic Drifting-Valve Systems, of which the following is a specification, reference being had to the accompanying drawings.

My invention relates to automatically functioning valves as a class.

It is well known that when steam of high temperature is shut off from engines, the cylinders, valve chambers and interior related parts having become highly heated, the lubricating oil will carbonize and cause much damage to these parts, as well as requiring an excess of power to again operate the engine, hence a great loss in fuel. Also that the presence of steam at any temperature in contact with these parts will prevent this carbonization. The purpose of my system is to overcome this carbonization. It will be seen that it is accomplished by a combination of four valves so arranged that when the engine steam is shut off, the system automatically admits steam at a low pressure upon the parts desired for a predetermined time, such as would allow those parts to cool below the flash point of the lubricating oils, and thus prevent carbonization thereof. Also to automatically shut off the boiler steam through the system to said parts when the engine is started, if before the lapse of the pre-determined time. The system provides an efficient means to admit steam automatically upon such parts only as long as desired there. While it is very well adapted for locomotives drifting along with steam shut off, it is quite as well adapted for any other engines using steam for motive power.

The object of my invention is to provide a valve system which will automatically open to and admit steam of a desired quantity and temperature from a supply source into engine cylinders when the operating steam therein is shut off, also to automatically close to said cylinders when the operating steam is again admitted into them. The purpose of my device is to prevent carbonization of lubricating oils within the cylinders and related parts, when the engine throttle is shut off. This object, as well as other advantages, I attain by the construction, combination and arrangement of parts illustrated in the accompanying drawings which form a part hereof.

Fig. 1 is a sectional elevation on the line 1—1 in Figs. 2 and 3.

Fig. 2 is an upper plan view of the valve system.

Fig. 5 is an enlarged view of timing valve in the lower portion of Fig. 1.

Fig. 6 is a sectional view on the line 6—6 in Fig. 5.

Like characters refer to like parts in the views.

Figure 3:
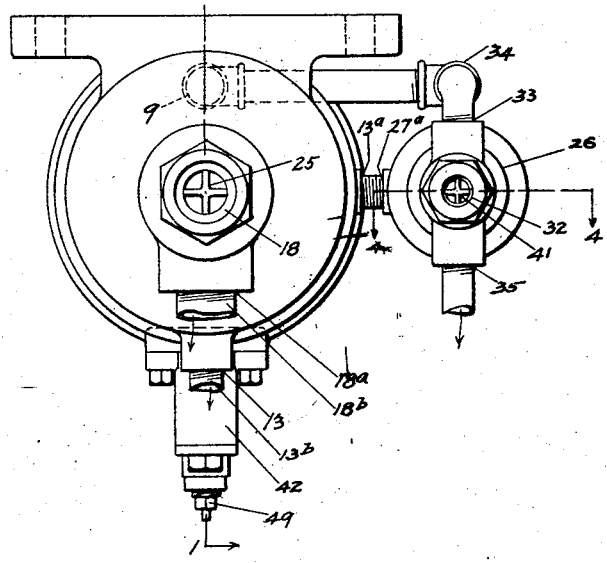
Fig. 3 is a right end view of the device as shown in Fig. 2.

For convenience I shall use names indicating to some extent the functions in the valve system. In the main part of the system there is a timing cylinder 7, provided with a head 8, having an application port 9 therein. The cylinder 7 also has a port 10 near its opposite end, and a small tandem cylinder 11, having a concentric head $11^a$, said head connecting with the tandem application cylinder 12. This cylinder has ports 13 and $13^a$ in the lower side and head thereof, and a small central cylinder 14, extending from it to a valve chamber 15 beyond. The chamber 15 has a valve seat 16 on the inner end of a central passage 17, extending outwardly from the chamber to a receiving port 18, adapted to be connected to a pipe extending from a desired source of steam supply. The chamber 15 also has a port $18^a$ on the lower side. The port $18^a$ is adapted to receive a pipe $18^b$ extending from the engine cylinders or valve chambers, and the port 13 to receive a pipe $13^b$ extending to a connection with the pipe $18^b$. In the cylinder 7 is a timing piston rod 19 having a piston 20 on one end, slidable in the cylinder 7, and a reduced piston 21 on its opposite end, slidable in the cylinder 11, making a differential piston in these cylinders. In the cylinder 12 is a piston 22, centrally connected to a piston 23, slidable in the cylinder 14. The piston 22 has lugs 22ª on its end, positioned to engage the end of the cylinder 12 and prevent the piston from closing the cylinder 11 or the port 13, and thus allow a free passage of steam between the port and cylinder.

Figure 9:
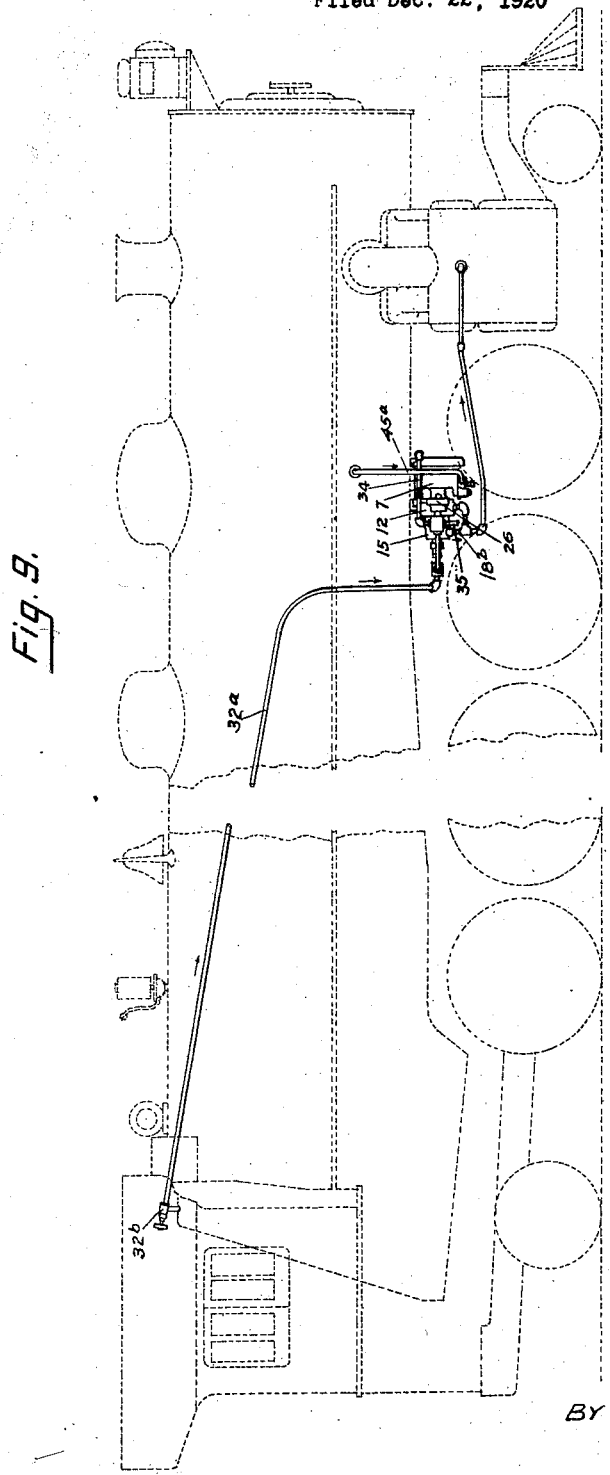
Fig. 9 is a view illustrating a locomotive in dotted lines with the device arranged thereon.

In central contact with the hub 24 on piston 23, is a disc admission valve 25, adapted to engage the seat 16. At one side of the main part just described, is the timing piston operating mechanism, see Fig. 4. Therein is a cylinder 26, having a head 27 at one end, with a port 27ª in this head, and a central tandem cylinder 28 extending from the opposite end of the cylinder to a valve chamber 29, having oppositely disposed valve seats 30 and 31 therein. A port 32 extends from the valve seat 31, and is adapted to receive a pipe 32ª extending from a desired source of steam supply. The pipe 32ª shown in Fig. 9 connects the ports 18 and 32 and the boiler of the locomotive outlined, and has a valve 32ᵇ. The valve is continuously open when the mechanism is in operative position and is closed only to stop operation, as for repairs or emergency. The valve chamber 29 also has an upper port 33, from which a connecting pipe 34 extends to the port 9 of the timing cylinder 7, and a lower port 35, connecting with the exhaust cavity of the engine cylinders, or to the atmosphere. The port 27ª is connected by a pipe 36 with the port 13ª of the application cylinder 12. In the cylinder 26 is a piston 37, centrally connected with piston 38, slidable in the cylinder 28, the latter piston having a central hub contact with double disc valves 40 and 41, adapted to engage their opposing seats 30 and 31 respectively, and movable in the valve chamber 29.

Below the cylinder 7 is the adjustable timing mechanism secured thereon. It has a valve body 42, with a valve chamber 43 therein, opening to the port 10 of the cylinder 7, and a returning valve 44 which seats in a port 45. The valve 44 is provided with a coil spring 46 to return it into its seat.

The port 45 is connected with a pipe 45ª, which extends to a water supply in the boiler from which the aforesaid steam supply is derived, preferably midway between the bottom and minimum low water line therein. The valve body 42 also has therein a timing valve 47, which seats in a port 48, also opening from the port 10 of the cylinder 7, and adjacent to the opening of the chamber 43 into the same port. The valve 47 may be grooved as shown in Figs. 5 and 6, to regulate a desired flow through it. The stem of the valve 47 is provided with adjusting means 49 whereby the valve may be caused to enter its seat at the end of a predetermined time.

Figure 4:
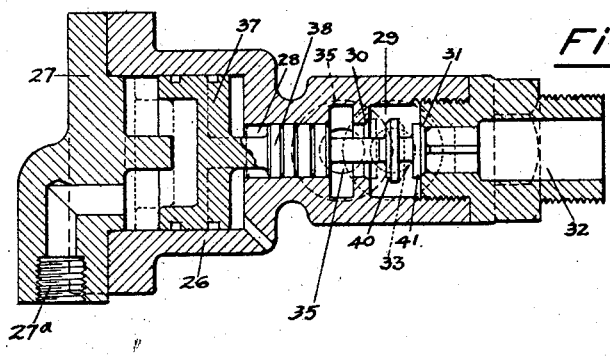
Fig. 4 is a horizontal sectional view of parts on the line 4—4 in Fig. 3.
Figure 7:
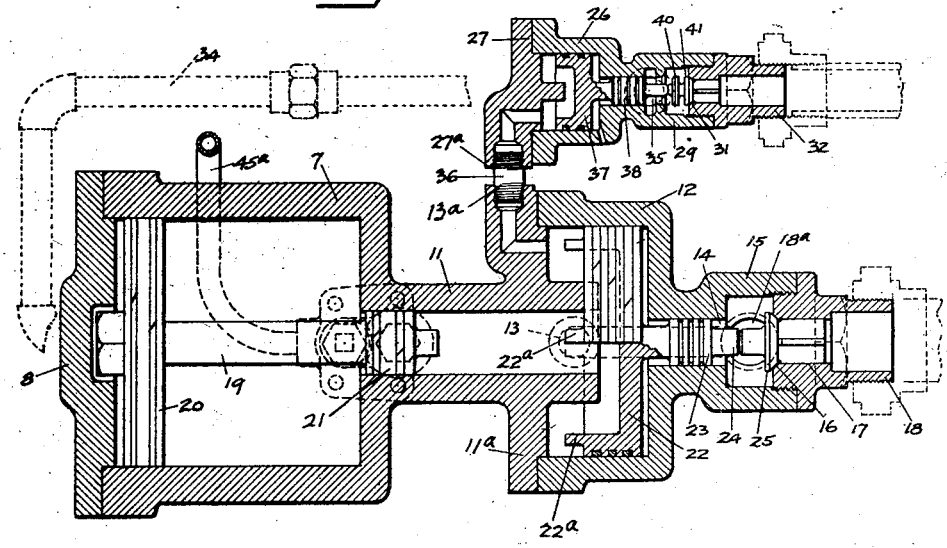
Fig. 7 is a horizontal, central sectional view of the structure as illustrated in Fig. 2.
Figure 8:
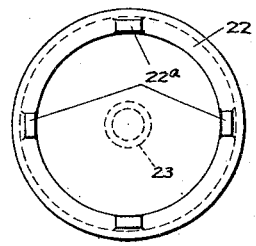
Fig. 8 is a detail view of the end of the piston 22.

Assume now that my value system device is connected with a source of water and steam supply in a boiler furnishing steam to the cylinders of an engine, and is also connected with all these cylinders, as indicated in the description of parts. In this operative situation the pistons and valves are shown in Figs. 1 and 4 in the positions they have when the throttle is open and the engine is running under power. In other words the device is then neutral. The dotted line positions of the pistons and valves show the changes they assume.

The operation will now be described. When the throttle is open to admit operating steam to the engine cylinders and valve chambers, the steam also proceeds from them through the pipe connections indicated, and through the ports 18ª and 13 into the cylinder 12 and chamber 15, also through the pipe 36 into the cylinder 26, where it impinges on the pistons 22 and 37, causing their pistons to move the valves 25 and 41 on their opposing ends into the respective seats 16 and 31. This prevents the admission of any steam through the ports 18 and 32, resulting in shutting off the system and leaving the mechanism in the position illustrated while the engine is in operation.

When the throttle is closed, the steam in the engine cylinders, and consequently in cylinders 12 and 26, because of their connections through ports 18ª and 13, immediately decreases in pressure until the total pressure against the large pistons 22 and 37 is less than the total pressure against the valves 25 and 41, with boiler pressure against them on the opposing side, on account of their difference in area. The valves 25 and 41 then move from their seats and move pistons 22 and 37 forward, thus allowing steam from the boiler to flow through ports 18 and 32, and from the chamber 15 through port 18ª to the engine cylinders and valve chambers, and from these back through port 13 to the cylinder 12, thence through the pipe 36 into the cylinder 26. The steam then impinges on the large pistons 22 and 37, and the condition is produced of a maintained steam pressure equal to the difference in the areas of the piston 22 and valve 25.

Simultaneously, steam passing through port 32 forces the valve 40 into its seat and allows steam at boiler pressure to proceed through port 33, thence through pipe 34 and port 9. However, because the difference in the areas of the valve 40 and piston 37 is greater than the difference in the areas of pistons 22 and 23, the valves 40 and 41 will remain open until steam is again admitted to the cylinders and valve chambers by opening of the engine throttle.

It will be further apparent that there is a difference in areas of pistons 20 and 21, so proportioned that boiler steam pressure between cylinder head 8 and piston 20, on the total area of the latter, will be greater than boiler water pressure between pistons 20 and 21, plus the steam pressure then maintained in cylinder 12, and acting against piston 21, while the throttle is closed and steam is admitted through ports 18, 18ª and 13, and controlled by valve 25 and differential pistons 22 and 23. Then, by reason of the difference in the areas of pistons 20 and 21, and the action of the water in pressing against both, these pistons will be forced forward, (to the right in Fig. 1), at a rate which can be controlled by restricting the escape of the water from the space between the pistons 20 and 21. This restricted escape is accomplished as follows. As the pistons 20 and 21 begin moving, pressure higher than that in the boiler is temporarily created on water in the space between pistons 20 and 21. This pressure, aided by returning valve spring 46, closes return valve 44 and opens timing valve 47. Thereupon water in cylinder 7 is forced through the grooved valve 47 in port 48, and pipe 45ª, back into the boiler at a rate governed by timing valve adjusting means 49, so that, in a pre-determined time, sufficient to allow engine cylinders, valve chambers and parts to cool below the temperature of carbonization, the movement of pistons 20 and 21 will cause pistons 22 and 23 to move forward, and in turn, piston 22 will force valve 25 to its seat, thus shutting off the steam from port 18 to the engine cylinders and valve chambers, and the spring of adjusting means 49 will close the valve 47. Pistons 20 and 21, with pistons 22 and 23, will then remain in this position, being shown in dotted lines, until steam is again admitted by the engine throttle, when the pressure from the engine cylinders and valve chambers proceeding through ports 13, 13ª and 27ª, causes piston 37 to seat the valve 41, thereby shutting off steam from the port 32 to port 33, and opening the way from ports 33 and 35 to the cylinder exhaust or to the atmosphere, thus relieving the pressure on the opposing side of piston 20, which, aided by steam pressure in the cylinder 12 upon the piston 21, causes pistons 20 and 21 to move rearward, with insufficient remaining water below boiler pressure in the cylinder to fill the enlarging space therein between the pistons 20 and 21. Water at boiler pressure then proceeds into the partial vacuum created there, through pipe 45ª, opens valve 44, passes through port 10 and moves pistons 20 and 21 into operating position as shown in Fig. 1, and the system is again ready to act in like manner when the throttle is closed.

I claim—

1. In a locomotive drifting valve mechanism, the combination of a drifting valve for controlling the admission of a limited quantity of steam to the engine cylinder when the throttle is closed, and means for controlling the duration of the opening of the drifting valve, comprising a piston connected with the valve and acted upon by the steam from the engine cylinder for closing the valve when the throttle is closed, a timing cylinder, a timing piston movable in the cylinder provided with means to cause operation of the drifting valve piston for actuating the drifting valve to closing position, means for admitting fluid to the timing cylinder for resisting movement of the timing piston, a conduit connecting the timing cylinder with a source of steam, a valve controlling the flow of steam through said conduit, and means connected with the valve and actuated by the steam from the engine cylinder when the throttle is closed for closing said last mentioned valve.

2. In a locomotive drifting valve mechanism, the combination of a drifting valve for controlling the admission of a limited quantity of steam to the engine cylinder, when the throttle is closed, and means for controlling the duration of the opening of the drifting valve, comprising a piston connected with the valve and acted upon by the steam from the engine cylinder for closing the valve when the throttle is closed, a timing cylinder, a timing piston movable in the cylinder provided with means to cause operation of the drifting valve piston for actuating the drifting valve to closing position, means for admitting fluid to the timing cylinder for resisting movement of the timing piston, a conduit connecting the timing cylinder with a source of steam, a valve controlling the flow of steam through said conduit, means connected with a valve and actuated by the steam from the engine cylinder when the throttle is closed for closing said last mentioned valve, and means for regulating the escape of the fluid in the timing cylinder for varying the time for completing the stroke of the piston.

3. In a locomotive drifting valve mechanism, the combination of a drifting valve for controlling the admission of a limited quantity of steam to the engine cylinder when the throttle is closed, and means for controlling the duration of the opening of the drifting valve, comprising a piston connected with the valve and acted upon by the steam from the engine cylinder for closing the valve when the throttle is closed, a timing cylinder, a timing piston movable in the cylinder provided with means to cause operation of the drifting valve piston for actuating the drifting valve to closed position, said cylinder being in communication with the boiler water of the locomotive, with said water resisting operative movement of the piston, and means for restricting the discharge of the water from said cylinder when the piston is operated, a conduit connecting the timing cylinder with a source of steam, a valve controlling the flow of steam through said conduit, and means connected with the valve and actuated by the steam from the engine cylinder when the throttle is closed for closing said last mentioned valve.

4. In a locomotive drifting valve mechanism, the combination of a drifting valve controlling the admission of a limited quantity of steam to the engine cylinder when the throttle is closed, a source of steam directly acting on the valve for opening said valve and admitting steam to the engine cylinders, and means for controlling the duration of the opening of the drifting valve, comprising a cylinder, a piston movable in said cylinder and connected with the valve, means connecting the cylinder with the source of steam for admitting steam to said cylinder when the drifting valve is open, a timing cylinder, a timing piston movable in the cylinder and provided with means to cause operation of the drifting valve piston for actuating the drifting valve to closing position, a conduit connecting the timing cylinder with the source of steam, a differential piston, a valve operated by the differential piston for controlling the flow of steam through the conduit, and a conduit connected with the first mentioned cylinder for directing steam against one portion of the differential piston for causing closing of the valve in the conduit which connects the timing cylinder with the source of steam.

5. In a locomotive drifting valve mechanism, the combination of a drifting valve controlling the admission of a limited quantity of steam to the engine cylinder when the throttle is closed, a source of steam directly acting on the valve for opening said valve and admitting steam to the engine cylinders, and means for controlling the duration of the opening of the drifting valve, comprising a cylinder, a piston movable in said cylinder and connected with the valve, means connecting the cylinder with the source of steam for admitting steam to said cylinder when the drifting valve is open, a timing cylinder, a timing piston movable in the cylinder and provided with means to cause operation of the drifting valve piston for actuating the drifting valve to closing position, a conduit connecting the timing cylinder with the source of steam, a differential piston carrying a valve for controlling the flow of steam through the conduit, and a conduit connected with the first mentioned cylinder for directing steam against one portion of the differential piston for causing closing of the valve in the conduit which connects the timing cylinder with the source of steam, said timing cylinder being in communication with a fluid supply, means for admitting fluid to the timing cylinder for resisting operative movement of the timing piston.

6. In a locomotive drifting valve mechanism, the combination of a drifting valve controlling the admission of a limited quantity of steam to the engine cylinders when the throttle is closed, a source of steam directly acting on the valve for opening said valve and admitting steam to the engine cylinders, and means for controlling the duration of the opening of the drifting valve, comprising a cylinder, a piston movable in said cylinder and connected with the valve, means connecting the cylinder with the source of steam for admitting steam to said cylinder when the drifting valve is open, a timing cylinder, a timing piston movable in the cylinder and provided with means to cause operation of the drifting valve piston for actuating the drifting valve to closing position, a conduit connecting the timing cylinder with the source of steam, a differential piston carrying a valve for controlling the flow of steam through the conduit, and a conduit connected with the first mentioned cylinder for directing steam against one portion of the differential piston for causing closing of the valve in the conduit which connects the timing cylinder with the source of steam, said timing cylinder being in communication with a fluid supply, means for admitting fluid to the timing cylinder for resisting operative movement of the timing piston, means for regulating the discharge of the fluid from the timing cylinder for controlling the time of the stroke of the piston.

7. In a locomotive drifting valve mechanism, the combination of a drifting valve controlling the admission of a limited quantity of steam to the engine cylinder when the throttle is closed, a source of steam directly acting on the valve for opening said valve and admitting steam to the engine cylinders, and means for controlling the duration of the opening of the drifting valve, comprising a cylinder, a piston movable in said cylinder and connected with the valve, means connecting the cylinder with the source of steam for admitting steam to said cylinder when the drifting valve is open, a timing cylinder, a timing piston movable in the cylinder and provided with means to cause operation of the drifting valve piston for actuating the drifting valve to closing position, a conduit connecting the timing cylinder with the source of steam, a differential piston carrying a valve for controlling the flow of steam through the conduit, and a conduit connected with the first mentioned cylinder for directing steam against one portion of the differential piston for causing closing of the valve in the conduit which connects the timing cylinder with the source of steam, a cylinder connecting the timing cylinder with the first mentioned cylinder, a piston movable in the connecting cylinder and forming the operating means for the drifting valve piston, the steam under pressure which is admitted to the cylinder of the drifting valve piston being adapted to act upon the last mentioned piston for forcing the timing piston to its normal inoperative position.

8. In a locomotive drifting valve mechanism, the combination of a drifting valve controlling the admission of a limited quantity of steam to the engine cylinders when the throttle is closed, a valve chamber to receive the drifting valve, a source of steam connected with the chamber and directly acting on the valve for opening said valve and admitting steam to the engine cylinders, and means for controlling the duration of the opening of the drifting valve, comprising a cylinder connected with the chamber for admitting steam to said cylinder, a piston movable in said cylinder and connected with the valve, a timing cylinder, a timing piston movable in the cylinder and provided with means to cause operation of the drifting valve piston actuating the drifting valve to closing position, a conduit connecting the timing cylinder with the source of steam, a differential piston carrying a valve for controlling the flow of steam through the conduit with the source of steam acting upon the valve to open the same, and a conduit connected with the first mentioned cylinder for directing steam against one face of the differential piston for causing closing of the valve in the conduit which connects the timing cylinder with the source of steam, said timing cylinder being in communication with a fluid supply, means for admitting fluid to the timing cylinder whereby said fluid will resist operative movement of the timing piston, and means for regulating the discharge of the fluid from the timing cylinder and controlling the time of the stroke of the piston when the steam admitted to the timing cylinder operates the timing piston.

9. In a locomotive drifting valve mechanism, the combination of a drifting valve controlling the admission of a limited quantity of steam to the engine cylinders when the throttle is closed, a valve chamber to receive the drifting valve, a source of steam connected with the chamber and directly acting on the valve for opening said valve and admitting steam to the engine cylinders, and means for controlling the duration of the opening of the drifting valve, comprising a cylinder connected with the valve chamber for admitting steam to said cylinder, a piston movable in said cylinder and connected with the valve, a timing cylinder, a timing piston movable in the cylinder and provided with means to cause operation of the drifting valve piston actuating the drifting valve to closing position, a conduit connecting the timing cylinder with the source of steam, a differential piston carrying a valve for controlling the flow of steam through the conduit with the source of steam acting upon the valve to open the same, and a conduit connected with the first mentioned cylinder for directing steam against one face of the differential piston for causing closing of the valve in the conduit which connects the timing cylinder with the source of steam, said timing cylinder being in communication with a fluid supply, means for admitting fluid to the timing cylinder whereby said fluid will resist operative movement of the timing piston, and means for regulating the discharge of the fluid from the timing cylinder and controlling the time of the stroke of the piston when the steam admitted to the timing cylinder operates the timing piston, the steam under pressure which is admitted to the cylinder of the drifting valve piston being adapted to act upon the means connected with the timing piston when the throttle is open for forcing the timing piston to its normal inoperative position.

CLINTON O. MIKLE.